United States Patent [19]

Fujita et al.

[11] Patent Number: 5,012,571
[45] Date of Patent: May 7, 1991

[54] METHOD OF MANUFACTURING SPIRALLY LAYERED AND ALIGNED PRINTED-CIRCUIT ARMATURE COIL

[75] Inventors: Masahiko Fujita; Yuuji Shishido; Yuzuru Suzuki; Masato Okamoto, all of Iwata, Japan

[73] Assignee: Minebea Co. Ltd., Japan

[21] Appl. No.: 487,145

[22] Filed: Mar. 2, 1990

Related U.S. Application Data

[62] Division of Ser. No. 332,931, Mar. 21, 1989, Pat. No. 4,962,329.

[30] Foreign Application Priority Data

Aug. 3, 1987 [JP] Japan ............................ 62-194014
Jul. 16, 1988 [JP] Japan ............................ 63-177588

[51] Int. Cl.$^5$ ............................................ H02K 15/04
[52] U.S. Cl. ........................................ 29/598; 29/605; 310/156; 310/254; 336/200; 336/206
[58] Field of Search .............. 29/596, 598, 605, 25.42; 310/156, 254, 208, 67 R; 336/200, 206, 96

[56] References Cited

U.S. PATENT DOCUMENTS

| | | |
|---|---|---|
| 3,587,019 | 6/1971 | Bull. |
| 3,641,640 | 2/1972 | Rayburn ............................ 29/25.42 |
| 4,645,961 | 2/1987 | Malsky. |
| 4,843,269 | 6/1989 | Shramo. |

*Primary Examiner*—Carl E. Hall
*Attorney, Agent, or Firm*—Oliff & Berridge

[57] ABSTRACT

A method of manufacturing an armature coil, which comprises a printed coil obtained by printing and arranging a plurality of sets of unit coil groups, each comprising an even number of unit coils, on a belt-like, thin and pliable insulating material, and a pliable insulating material overlaid over and wound together with the printed coil, wherein the gaps between the printed coil and the insulating material and between the adjoining material layers are filled for fixing in the state the printed coil and the insulating material have been wound and laminated into a cylindrical shape, is featured in that a thermoplastic adhesive material is applied to the surface of the insulating material, and a tailing end of the insulating material is adhered to the adjoining inner peripheral layer by heating at least in the step of winding and laminating the printed coil and the insulating material into a cylindrical shape.

4 Claims, 3 Drawing Sheets

METHOD OF MANUFACTURING SPIRALLY LAYERED AND ALIGNED PRINTED-CIRCUIT ARMATURE COIL

This is a division of application Ser. No. 07/332,931, filed Mar. 21, 1989, now U.S. Pat. No. 4,962,329.

TECHNICAL FIELD

The present invention relates to an armature coil suitable for a high precision motor or the like for use in office automation (OA) equipment, video equipment, etc. and more particularly to an armature coil and a manufacture method thereof in which plural sets of unit coils are printed on a film made of an insulating material, and the film is wound into a cylindrical shape comprising layers laminated one above another and fixed to each other.

BACKGROUND ART

As armature coils for small-sized motors, there have heretofore been known armature coils manufactured by winding a printed coil into a cylindrical shape, as disclosed in Japanese Patent Laid-Open No. 55-147936 (1980), for example.

To date, armature coils fabricated using printed coils have been constructed as follows. An even number (this number is determined dependent on the number of phases, laminated layers and poles of the armature coil) of unit coils are printed on a belt-like, pliable and thin insulating material at respective predetermined positions, thereby forming a printed coil. The printed coil is wound into a cylindrical shape such that the r-th unit coil ($1 \leq r \leq P$, where P is the number of poles of the armature coil) counting from an end of the printed coil is overlapped with the (P+r)-th and (2P+r)-th unit coils in terms of mechanical arrangement and electrical phase. Then, laminated layers of the wound printed coil are fixed to each other using an adhesive to provide an armature coil in which the respective unit coils are arranged at their predetermined positions.

Since the unit coils formed on the insulating material have all a constant width of conductors and a constant gap between the adjacent conductors, discrepancy between the inner peripheral side and the outer peripheral side in the cylindrically wound printed coil has been adjusted by varying a width of the area surrounded by the innermost periphery of spiral conductor pattern of each unit coil.

Use of such an armature coil comprising a printed coil wound into a cylindrical shape can make the gap between a rotor magnet and a stator core narrower than that in a wound-type motor having a hollow coil adhered. This is advantageous in reducing torque ripple with the more uniform magnetic flux density and hence providing a motor which exhibits a high torque characteristic without cogging (torque fluctuations).

In the printed coil, however, it is required for conductor foils to be etched deeply and narrowly in order to reduce the resistance value. Thus, operation has to be carried out under very strict etching conditions. Furthermore, conventional armature coils have not taken into account special care about the conductor pitch of a multiplicity of unit coils formed on an insulating material. With all conductors formed at equal intervals as mentioned above, etching had to be made very narrowly throughout the elongate printed coil. This has disadvantages in that operability is poor, throughput (yield, the same shall apply hereinafter) of the etching process is lowered, and hence the cost is increased.

In addition, for obtaining high rotational precision by assembling the armature coil into a motor, a plurality of unit coils are required to be overlapped with high accuracy. But, when a cylindrical armature coil is formed using the printed coil of conventional structure, a problem arises in that aligning operation is difficult and hence needs a lot of time.

Therefore, the motor using the armature coil of conventional structure is superior in performance, but poor in economy.

A method of laminating and fixing a printed coil in the conventional manufacture process of an armature coil will be described below.

The method of laminating and fixing a printed coil includes the steps of placing a thin, pliable insulator such as a polyester film on the surface of the printed coil to avoid contact between conductor patterns formed thereon, and winding the printed coil and the thin insulator together plural times (at this time, the thin insulator is so wound as to enter between every two laminated layers of the printed coil). Then, after temporary fixing as described later, an adhesive is applied between the printed coil and the thin insulator and between the adjacent thin insulators.

In the above process of laminating and fixing the printed coil, the wound coil obtained by winding the printed coil with the insulator interposed between the laminated layers is held in its cylindrical shape by temporarily fixing a trailing end of the insulator, which is made larger than the printed coil beforehand, to the adjoining inner peripheral layer using an adhesive or sticky tape. Thereafter, the adhesive is applied to fix between the printed coil and the thin insulator.

Therefore, such drawbacks have accompanied this method in that, in the temporarily fixed portion using a new adhesive or a sticky tape, the applied adhesive may have an uneven thickness, or the thickness is partially increased corresponding to that of the sticky tape, so that the finished armature coil may have its shape not uniform all around the circumference, and operability of the laminating and fixing process may become poor.

DISCLOSURE OF INVENTION

It is an object of the present invention to solve the foregoing drawbacks in the prior art, and to provide an armature coil of novel structure with which most of very strict etching conditions can be alleviated, and operability is hence improved on the whole, and which has high throughput and is superior in economy.

More specifically, an armature coil of the present invention resides in the type that a plurality of sets of unit coil groups, each comprising an even number of unit coils, are printed and arranged on a belt-like, thin and pliable insulating material to form a printed coil, and the printed coil is wound and fixed into a cylindrical shape, the armature coil being featured in that the gap between adjacent conductors of the unit coil groups located on the outer periphery side of the cylindrical shape is set larger than the gap between adjacent conductors of the unit coil groups located on the inner periphery side thereof such that the conductors of respective unit coils are axially arranged to take the same angle in the circumferential direction.

With the armature coil thus constructed, since the gap between adjacent conductors of the unit coil groups located on the outer periphery side of the cylindrical shape is set larger than that of the unit coil groups located on the inner periphery side thereof, only a part of the printed coil is subjected to very strict etching conditions in the etching process. Thus, operation is relatively facilitated and throughput is significantly improved as compared with the prior art.

Further, since the conductor patterns are printed and arranged in advance such that the conductors of the respective unit coils are axially arranged to take the same angle in the circumferential direction, there is no need of overlapping the plural unit coils with high accuracy in the step of winding the printed coil into a cylindrical shape, thereby resulting in the increased winding operability. Thus, a significant improvement is obtained in economy on the whole.

A method of manufacturing an armature coil of the present invention is aimed to overcome the drawbacks in the prior art; i.e., to make a thickness of the armature coil uniform all around the circumference and to improve operability of the laminating and fixing step.

More specifically, the present method of manufacturing an armature coil, which comprises a printed coil obtained by printing and arranging a plurality sets of unit coil groups, each comprising an even number of unit coils, on a belt-like, thin and pliable insulating material, and a pliable insulating material overlaid over and wound together with the printed coil, wherein the gaps between the printed coil and the insulating material and between the adjoining material layers are filled for fixing in the state the printed coil and the insulating material have been wound and laminated into a cylindrical shape, is featured in that a thermoplastic adhesive material is applied to the surface of the insulating material, and a trailing end of the insulating material is adhered to the adjoining inner peripheral layer by heating at least in the step of winding and laminating the printed coil and the insulating material into a cylindrical shape.

With the above method of the present invention, the conventional thin insulator, which was interposed and wound together with the printed coil in the prior art to avoid contact between the conductor patterns formed on the printed coil during the laminating step, is replaced by a thin and pliable insulator having on its surface a thin thermoplastic adhesive layer formed beforehand. The latter insulator is interposed and wound together with the printed coil. Then, temporary fixing is made by fusing the thermoplastic adhesive layer on a trailing end of the insulator by heating, to thereby adhere the insulator end to the adjoining inner peripheral layer. This makes the thickness of the temporarily fixed portion equal to that of the remaining portion of the armature coil. In other words, the shape of the armature coil becomes uniform all around the circumference, which improves the armature coil and hence the motor in quality. What is needed for fixing is just heating, so operability of the laminating and fixing step is also improved.

BEST MODE FOR CARRYING OUT THE INVENTION

Figure 1:
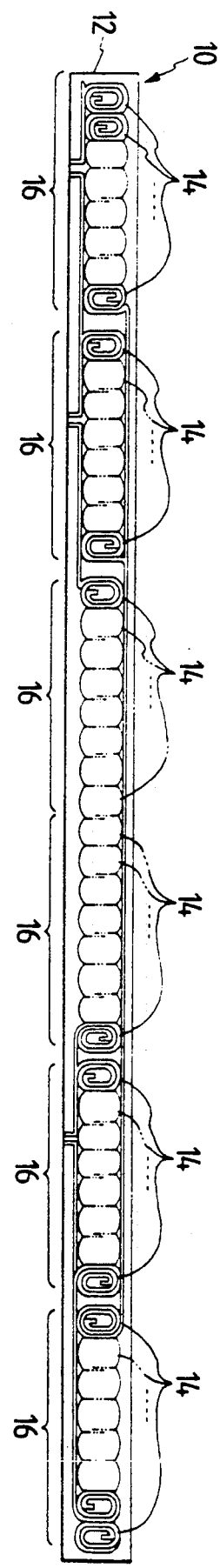
FIG. 1 is a plan view showing one example of a printed coil for use in the present invention.

FIG. 1 is a plan view showing one embodiment of a printed coil for use in an armature coil according to the present invention. A printed coil 10 is constructed as follows. $2 \times n$ sets (where n is a positive integer and equal to 3 (n=3) in FIG. 1) of unit coil groups 16, each of which comprises an even number, i.e., $2 \times m$ (where m is a positive integer and equal to 4 (m=4) in FIG. 1) of unit coils 14, are printed and arranged on the front side of a belt-like, thin and pliable single insulating base material 12 at predetermined positions with predetermined intervals. The same number of unit coil groups each comprising the same number of unit coils are formed also on the back side of the insulating base material 12 at the same positions as those on the front side.

Figure 2:
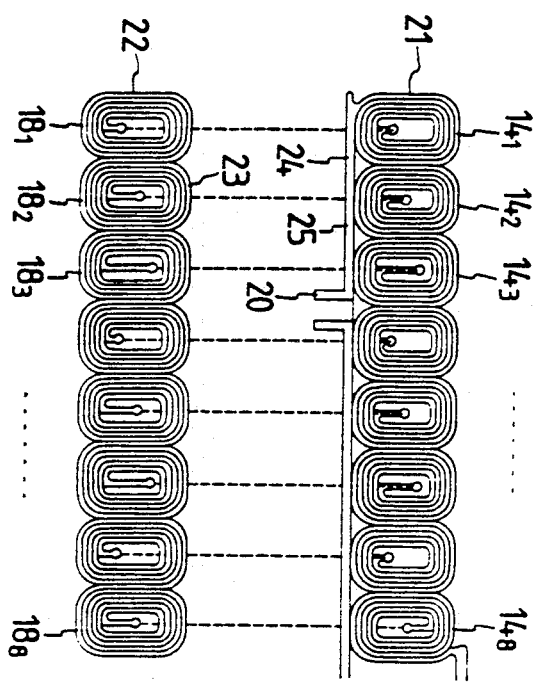
FIG. 2 is a detailed view showing one example of a front side unit coil group and a back side unit coil group of the printed coil.
Figure 3:
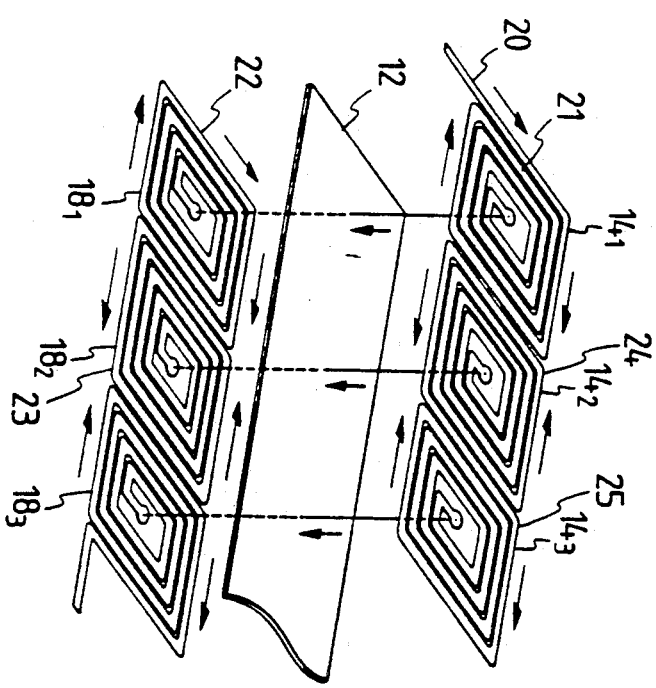
FIG. 3 is an explanatory view showing a configuration of conductor patterns and the connection state thereof.

FIG. 2 shows details of one unit coil group on the front side and another unit coil group on the back side both located at a left end of the printed coil 10 in FIG. 1. In FIG. 2, each dotted line illustrates that a front side conductor and a back side conductor corresponding to each other are electrically interconnected at the centers of their spiral patterns through the insulating base material. FIG. 3 schematically illustrates a construction of lefthand respective three unit coils (in total of six on both front and back sides) in FIG. 2. Note that starting from the left end in FIG. 2, the front side unit coils are respectively designated at $14_1, 14_2, \ldots, 14_8$, and the back side unit coils are respectively designated at $18_1, 18_2, \ldots, 18_8$.

There are two types of unit coils, i.e., clockwise (right-handed) and counterclockwise (left-handed) unit coils, which are oppositely arranged in pairs on the front and back sides. By referring to FIG. 3, a configuration of conductor patterns and the connection state thereof will now be described assuming that a current flows as indicated by arrows. First, the current enters from a terminal 20 to the outer periphery of the first unit coil $14_1$ on the front side, and then reaches the inner periphery thereof while passing through a conductor pattern 21 clockwise. With the conductor patterns on the front and back sides interconnected at their inner peripheries, the current now goes to the first unit coil $18_1$ on the back side and reaches its outer periphery while passing through a conductor pattern 22 clockwise. Here, the current transfers to the adjacent second unit coil $18_2$ and reaches its inner periphery while passing through a conductor pattern 23 counterclockwise. Having transferred from the back side to the front side at that inner periphery, the current now enters the second unit coil $14_2$ on the front side and reaches from its inner periphery to its outer periphery while passing through a conductor pattern 24 counterclockwise. Then, the current goes to a conductor pattern 25 of the adjacent third unit coil $14_3$. The unit coils and the unit coil groups are made up by such repeated patterns as mentioned above.

Figure 4:
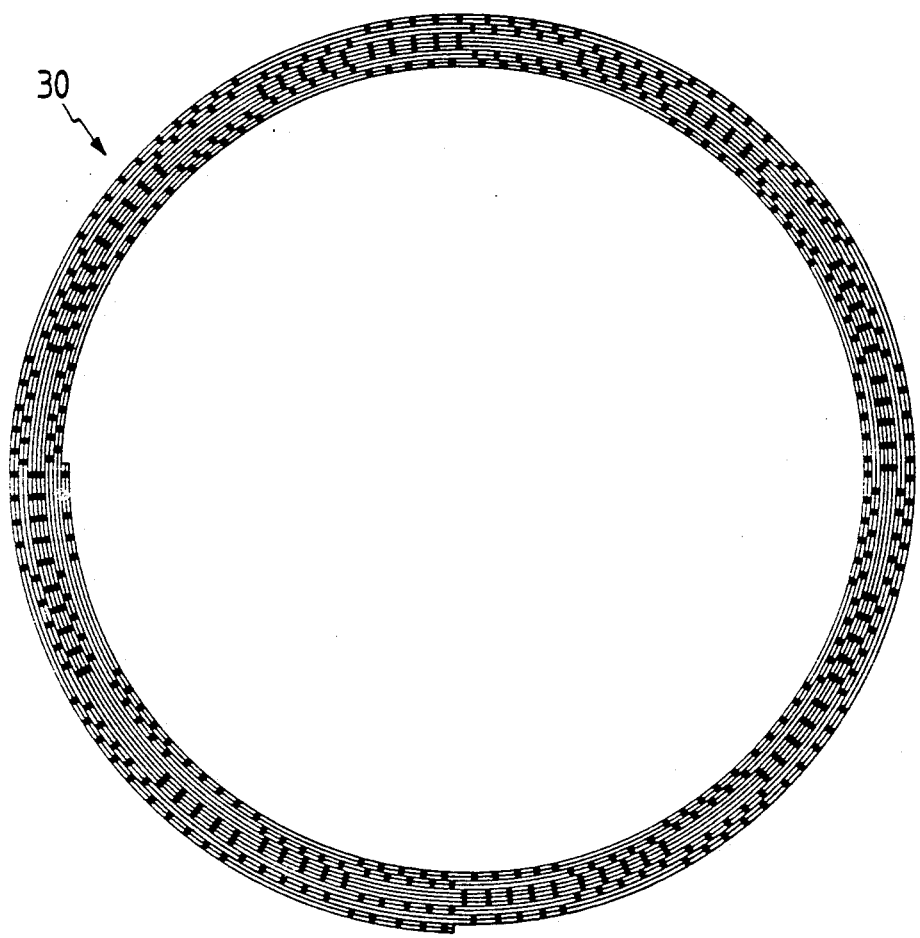
FIG. 4 is a sectional view showing one example of an armature coil according to the present invention.

In other words, each of the unit coil groups 16 comprises pairs of clockwise and counterclockwise unit coils 14 which are arranged in the electrically same phase on the front and back sides. In case of FIG. 1, therefore, the unit coil group 16 on the front side consists of four pairs of unit coils. The printed coil 10 is then wound into a cylindrical shape with its left end in FIG. 1 positioned at the inner periphery side and its right end positioned at the outer periphery side (such that each unit coil group runs around the cylinder shape), thereby forming an armature coil 30 as shown in FIG. 4. Accordingly, the length of the unit coil groups is different between the inner and outer peripheral sides, and the unit coil groups near the outer peripheral side (the right end in FIG. 1) have a larger length.

The printed coil 10 is fabricated by forming an etching resist of predetermined configuration on a well-known printed substrate, which comprises an insulating base material having foil-like conductors secured to both sides thereof, by the use of the relief printing or screen printing technique or the photoresist technique, and then removing those parts of foil-like conductors which are not covered with the etching resist by the use of the chemical or electrical etching technique, etc. to thereby leave a predetermined conductor pattern.

The feature of the present invention is in that the conductors of the respective unit coils 14 are axially arranged to take the same angle in the circumferential direction, allowing the corresponding conductor patterns to be overlapped with each other (see FIG. 4). In other words, the width of each axially extending conductor correlating with torque generation of a motor is held constant, while the gap between the adjacent conductors is varied, so that the conductors of the respective layers are arranged to take the same angle in the circumferential direction to make the conductor's arrangement uniform with respect to rotation of a rotor magnet. To this end, unlike the prior art, the gap between adjacent conductors of the unit coil groups located on the outer periphery side of the cylindrical shape is set larger than the gap between adjacent conductors of the unit coil groups located on the inner periphery side thereof. This is nothing less than the principal feature of the present invention. With the above method for constructing conductor patterns, the previously required strict conditions for manufacturing the printed coil 10 are alleviated in large part and hence throughput (yield) of the etching process is improved as compared with the prior art.

Construction of the armature coil 30 will now be described.

FIG. 4 is a sectional view of the armature coil 30 obtained by winding the printed coil 10 into a cylindrical shape as set forth above.

When the printed coil 10 shown in FIG. 1 is wound to a cylindrical shape, the unit coils 14 have each a mechanical angle of 45 degrees in the circumferential direction (45 degrees is resulted from the equation of 360 degrees $\div 8 = 45$ degrees, because one set of unit coil group runs around the cylindrical shape and includes eight unit coils). Also, there are defined relative offsets corresponding to a mechanical angle of 30 degrees between the first and second unit coil groups and between the second and third unit coil groups, respectively, and relative offsets corresponding to a mechanical angle of 15 degrees between the fourth and fifth unit coil groups and between the fifth and sixth unit coil groups, respectively. (Note that there is no relative offset between the third and fourth unit coil groups which are to be overlapped with each other). Therefore, the unit coils of the i-th (where i is an integer meeting $i \leq n$) unit coil group counting from the left end of the printed coil 10 respectively corresponds to those of the $(2 \times n + 1 - i)$-th, i.e., $(7-i)$-th (because of $n=3$ in FIG. 1), unit coil group (namely, the corresponding unit coils locate at the same position in the circumferential direction). At this time, the center lines of conductors of the corresponding unit coils 14 lie substantially on the normal line, and hence the respective conductors in the corresponding layers are arranged similarly in the circumferential direction (i.e., the unit coils of the first and sixth, the second and fifth, and the third and fourth unit coil groups are overlapped with each other, respectively).

Figure 5:
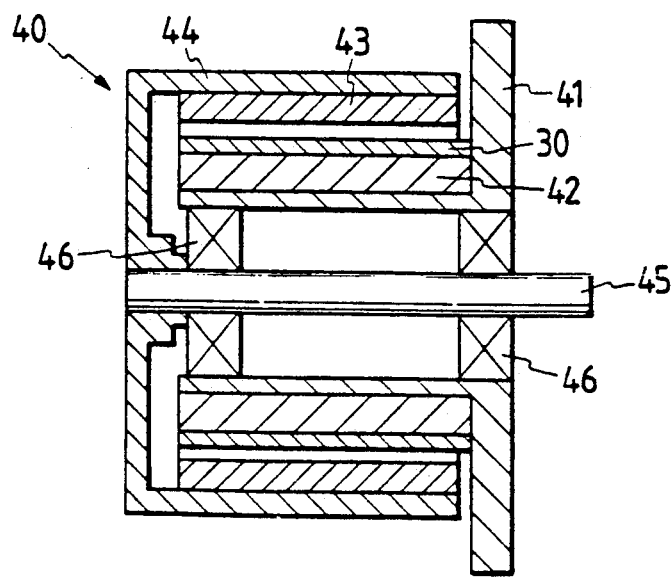
FIG. 5 is a sectional view showing one example of a motor using the armature coil.

FIG. 5 is a sectional view showing one example of a motor using the armature coil 30 according to the present invention. An illustrated motor 40 comprises a stator unit including a magnetic back yoke 42 and the armature coil 30 both attached to a stator yoke 41, and a rotor unit including a rotor magnet 43, which has the same number of poles as the armature coil 30 and magnetized in the radial direction, a magentic rotor yoke 44 and a shaft 45, the rotor unit being supported on the shaft 45 by a bearing 46. The magnetic circuit formed here is a closed loop in which the magnetic flux generated by the rotor magnet 43 first penetrates the armature coil 30, then penetrates the armature coil 30 again through the magnetic back yoke 42, enters the adjacent magnet pole, and finally returns to the starting point through the rotor yoke 44. When a certain current is passed through the armature coil 30 in match with the phase of the rotor magnet 43 while holding the stator yoke 41 stationary, the rotor magnet 43 is smoothly rotated together with the shaft 45 and the rotor yoke 44. To the contrary, by holding the rotor yoke 44 stationary in the same construction, a motor may be resulted in which the armature coil 30 is rotated together with the stator yoke 41 and the magnetic back yoke 42.

Figure 6:
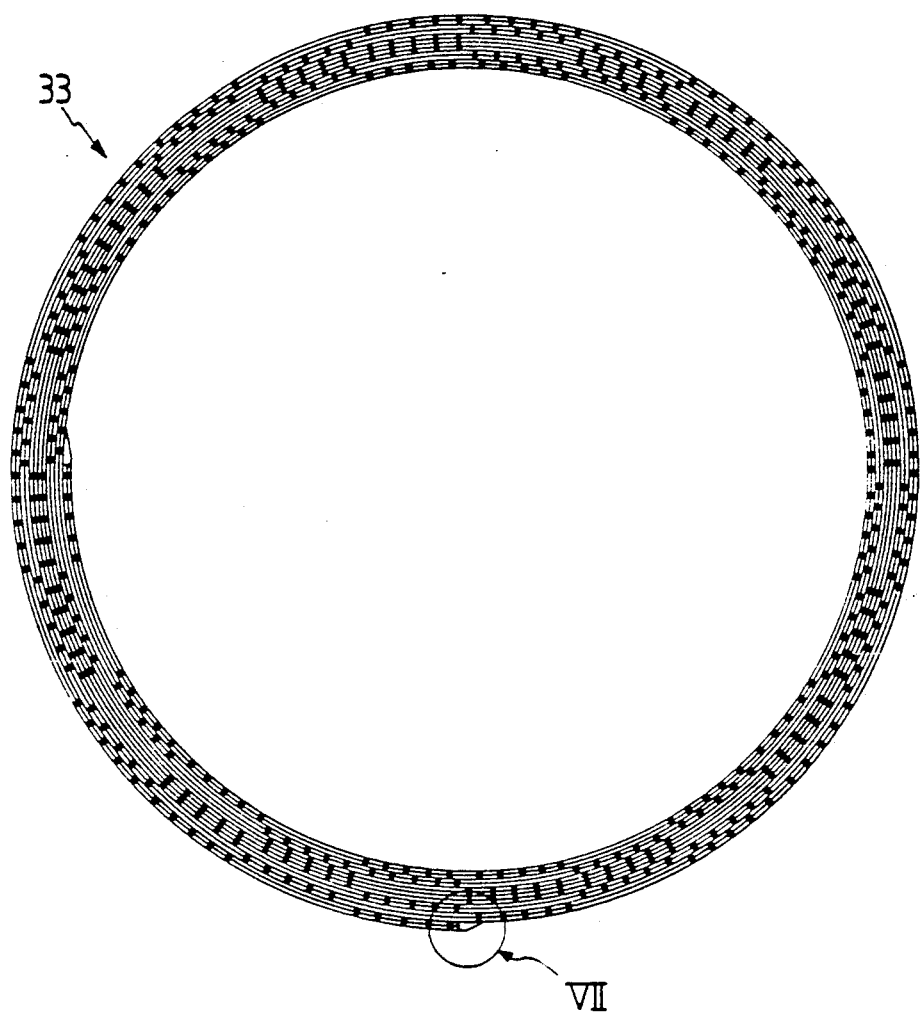
FIG. 6 is a sectional view of an armature coil obtained by laminating and fixing the printed coil into a cylindrical shape and then adhering a tip end of the printed coil with heating.
Figure 7:
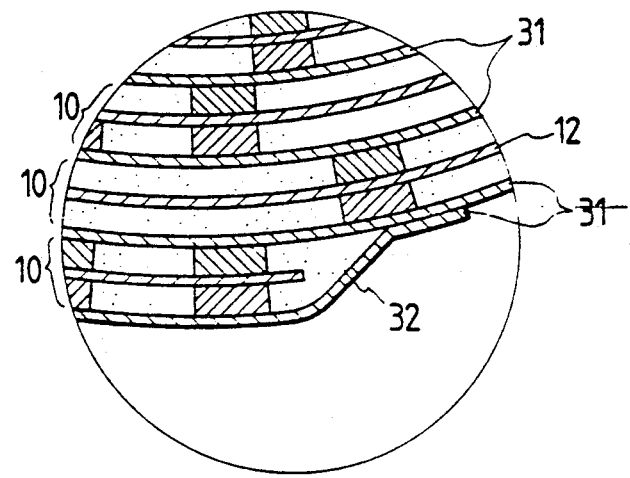
FIG. 7 is an enlarged sectional view of a portion indicated by arrow VII in FIG. 6.

Next, a method of laminating and fixing the printed coil according to the present invention will be described in detail. FIG. 6 illustrates, in section, an armature coil 33 of the present invention obtained by laminating and fixing the printed coil 10 into a cylindrical shape. More specifically, the armature coil 33 of the present invention comprises the foregoing printed coil 10, a thin and pliable insulating material 31 having thin and adhesive thermostatic layers formed on both of its surfaces in advance, and an adhesive 32 filled between the printed coil 10 and the insulating material 31 for tightly fixing the printed coil 10 and the insulating material 31 after the laminating and fixing process (see FIG. 7).

According to the method of laminating and fixing the armature coil 33 of the present invention, the insulating material 31 is first wound around a jig or winding core (not shown) one or more turns while being secured thereto, and the printed coil 10 is then overlaid and wound together with the insulating material 31. Therefore, the insulating material 31 is inserted between adjacent layers of the printed coil 10, so that any contact between conductors of the unit coils on the printed coil 10 thus overlaid and wound is avoided with certainty. The insulating material 31 is set larger than the printed coil 10, and after the trailing end of the printed coil 10 has been wound, the trailing end of the insulating material 31 is further wound one or more turns. In the past, the trailing end of the insulating material 31 was temporarily fixed to the adjoining inner peripheral layer using an adhesive or sticky tape in order to keep the wound shape unchanged. Thus, the thickness of the adhesive or sticky tape made the outermost peripheral surface uneven, and hence the finished armature coil could not had a uniform thickness all around the circumference thereof. In contrast, according to the present invention, the trailing end of the insulating material 31 is heated from the exterior to fuse the thermoplastic adhesive layer of the insulating material 31 so that the fused portion is bonded to the adjoining insulating material on the inner side for temporary fixing. After temporary fixing, the printed coil 10 and the insulating material 31 are fixed in place with the thermoplastic adhesive layers formed on the surfaces of the insulating material 31 beforehand or an adhesive 32 additionally applied from the exterior.

With the above temporarily fixing method, the thickness of the finished armature coil becomes uniform all around the circumference thereof, variations in shape of the individual armature coils are lessened, and hence product quality can be stabilized. In addition, there can also be attained an economical effect that operability of the laminating and fixing process is improved significantly.

What is claimed is:

1. A method of manufacturing an armature coil comprising:

obtaining a printed coil formed by printing and arranging a plurality of sets of unit coil groups, each comprising an even number of unit coils, on a belt-like, thin and pliable insulating base material;

obtaining a pliable insulating material layer having a length greater than a length of said base material and two oppositely facing surfaces, said insulating material layer having adhesive thermoplastic layers formed on both of said oppositely facing surfaces;

overlying said insulating material layer over said printed coil;

winding said overlaid insulating material layer and said printed coil into a wound and laminated cylindrical shape; and adhering a trailing end of said insulating material layer to an adjoining inner peripheral layer of said wound and laminated cylindrical shape by heating said trailing and at least during the step of winding and laminating said printed coil and said insulating material layer into said cylindrical shape so as to fuse and bond the thermoplastic layer on said trailing end to the thermoplastic layer on said adjoining inner peripheral layer.

2. The method of claim 1, further comprising: fixing said printed coil to said insulating material layer after said step of adhering the trailing end to the adjoining inner peripheral layer.

3. The method of claim 2, wherein said fixing is achieved by filling gaps between said printed coil and said insulating material layer and between adjoining insulating material layers with an adhesive.

4. The method of claim 2, wherein said fixing is achieved with said adhesive thermoplastic layers.

* * * * *